(12) United States Patent
Widzgowski

(10) Patent No.: US 7,345,800 B2
(45) Date of Patent: Mar. 18, 2008

(54) OPTICAL ARRANGEMENT FOR DEFLECTING A LIGHT BEAM

(75) Inventor: Bernd Widzgowski, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 2 days.

(21) Appl. No.: 11/347,450

(22) Filed: Feb. 3, 2006

(65) Prior Publication Data

US 2006/0176536 A1 Aug. 10, 2006

Related U.S. Application Data

(60) Provisional application No. 60/757,845, filed on Jan. 10, 2006.

(30) Foreign Application Priority Data

Feb. 4, 2005 (DE) ...................... 10 2005 005 512

(51) Int. Cl.
*G02B 26/08* (2006.01)
(52) U.S. Cl. ...................... 359/201; 359/202
(58) Field of Classification Search ................ 359/201, 359/202
See application file for complete search history.

(56) References Cited

U.S. PATENT DOCUMENTS 6,211,988 B1 * 4/2001 Engelhardt et al. ......... 359/201
6,433,908 B2 * 8/2002 Seel ............................ 359/201
6,618,178 B2   9/2003 Engelhardt ................... 359/201
7,018,042 B2 * 3/2006 Engelhardt ................... 359/639
7,019,878 B2 * 3/2006 Mikami ....................... 359/216
2002/0008904 A1 * 1/2002 Engelhardt ................... 359/368

FOREIGN PATENT DOCUMENTS

DE    196 54 210    6/1998
DE    100 33 549    1/2002

* cited by examiner

*Primary Examiner*—Stephone B. Allen
*Assistant Examiner*—Jade Callaway
(74) *Attorney, Agent, or Firm*—Darby & Darby

(57) ABSTRACT

An optical arrangement for deflecting a light beam includes first and second deflection devices, and a coupling mirror. The first deflection device is rotatable about a first axis using a first rotary drive, and includes two mirrors disposed non-rotatably with respect to each other in an angular position so as to rotate jointly about the first axis. The second deflection device is rotatable about a second axis using a second rotary drive, and includes a third mirror. The coupling mirror deflects the light beam onto the first or second mirror at an angle greater than 45° relative to the surface of the mirror. The first and second axes are perpendicular to each other. The first and a second mirrors rotate jointly about the first axis so that the light beam rotates about a center of rotation located on the second axis.

30 Claims, 3 Drawing Sheets

OPTICAL ARRANGEMENT FOR DEFLECTING A LIGHT BEAM

Priority is claimed to U.S. Application 60/757,845, filed by applicant on Jan. 10, 2006, and to German patent application DE 10 2005 005 512.5, filed on Feb. 4, 2005, the entire subject matters of both of which are hereby incorporated by reference herein.

The present invention relates to an optical arrangement to deflect a light beam, particularly in two directions that are essentially perpendicular to each other, preferably for use in confocal scanning microscopes, comprising two deflection devices that can each be rotated by means of a rotary drive around two axes positioned perpendicular to each other, namely, the x-axis and the y-axis, whereby one of said deflection devices comprises a mirror that can be rotated around the x-axis and the other deflection device comprises two mirrors that are arranged non-rotatably with respect to each other in a specified angular position and that rotate jointly around the y-axis, and whereby, due to the mirrors that rotate around the y-axis, the light beam rotates around a center of rotation that is located on the axis of rotation of the mirror that rotates around the x-axis.

BACKGROUND

Optical arrangements of the type under discussion here are known, for instance, from German patent application DE 196 54 210 A1. In technical circles, such arrangements are called K-scanners. The known K-scanners have the disadvantage that, due to the fact that they are coupled in along the direction of the optical axis, the arrangement has a relatively large physical size and can only be miniaturized to a limited extent. Moreover, the first mirror in the beam path is struck by the incident light beam at an extremely flat angle, so that the mirror has to have an unusually large surface area. The scanning rate is correspondingly limited. Moreover, in this form, the scanner is very polarization-dependent.

German patent application DE 100 33 549 A1 likewise discloses a so-called K-scanner that is coupled in at 90° relative to the optical axis, so that fundamentally, a smaller size can be achieved than with the above-mentioned K-scanner. In this case, the coupling is done via a coupling mirror that is independent of the actual deflection devices and their mirrors and that is arranged so as to be stationary. With these prior-art K-scanners as well, the first mirror of the deflection device is struck by the light beam at an extremely flat angle so that the same drawbacks arise as with the K-scanner from the above-mentioned publication. Undesired polarization effects occur here, too.

SUMMARY OF THE INVENTION

It is an object of the present invention to provide an optical arrangement for deflecting a light beam, particularly in two directions that are perpendicular (substantially perpendicular) to each other, preferably for use in confocal scanning microscopes, in such a way that, while avoiding undesired polarization effects, the smallest possible physical size of the arrangement can be attained, especially in order to achieve easy replacement of suitable monolithic blocks.

The present invention provides an optical arrangement for deflecting a light beam includes first and second deflection devices, and a coupling mirror. The first deflection device is rotatable about a first axis using a first rotary drive, and includes two mirrors disposed non-rotatably with respect to each other in an angular position so as to rotate jointly about the first axis. The second deflection device is rotatable about a second axis using a second rotary drive, and includes a third mirror. The coupling mirror deflects the light beam onto the first or second mirror at an angle greater than 45° relative to the surface of the mirror. The first and second axes are perpendicular to each other. The first and a second mirrors rotate jointly about the first axis so that the light beam rotates about a center of rotation located on the second axis.

It has been recognized according to the invention that, by using a special coupling mirror that is independent of the actual deflection devices, the light beam can be coupled in at different sites in the arrangement. Moreover, it has been recognized in concrete cases that a suitable selection of the coupling site is not sufficient to eliminate the undesired polarization effects that occur in the state of the art. Thus, it has been recognized in concrete cases that the physical size can be reduced through the selection of the coupling site. The undesired polarization effects can be reduced or even eliminated when the incident light beam strikes the first mirror of the deflection device at a suitable angle. Thus, in a manner according to the invention, the light beam strikes the first mirror of the deflection device (y-deflection device) that rotates around the y-axis at an angle greater than 45° relative to the surface of the mirror, so that the flat angle that is necessarily attained in the state of the art is avoided and the undesired polarization effects are largely eliminated. Thus, two advantages are achieved at the same time, as a result of which a compact design of the device in a monolithic manner becomes possible.

From a concrete structural standpoint, particularly regarding a small physical size, it is advantageous for the coupling mirror to be arranged in the area between the two mirrors that rotate around the y-axis close to the beam path that extends between the mirrors. In this manner, the coupling site is located in the area between the deflection devices, said coupling mirror likewise being associated with this area. This already makes it possible for the device to have a small size.

At this juncture, it should be pointed out that the deflection device that rotates around the y-axis, that is to say, the y-deflection device, comprises two mirrors that are preferably arranged in an unchanged angular position with respect to each other on a shared support and that correspondingly rotate together around the y-axis. The coupling mirror is arranged stationarily relative to the y-deflection device in such a way that the mirrors that rotate together around the y-axis, together with their supports, rotate around the coupling mirror, whereby the beam path of the incident light beam that strikes the coupling mirror is essentially free.

With an eye towards a concrete embodiment, it is practical for the coupling mirror to be arranged between the mirror that is closest to the y-rotary drive and the x-rotary drive or the deflection device that rotates around the x-axis, so that the coupling mirror arrangement is integrated into the area of the deflection devices. This likewise contributes to the miniaturization of the entire arrangement.

In order to achieve the smallest possible physical size as well as to avoid undesired polarization effects, it is advantageous for the coupling mirror to deflect the light beam on the side facing away from the y-rotary drive onto the mirror that is closest to the y-rotary drive and that belongs to the deflection device that rotates around the y-axis. particularly in the case of such an arrangement, it is possible to realize suitable angles of incidence at which no polarization effects occur due to an excessively flat angle of incidence.

It should be pointed out here that the rotary drives—the y-rotary drive and the x-rotary drive—are advantageously configured as galvanometer drives, so that a small physical size is possible as a result. If necessary, resonant galvanometer drives can be employed.

Especially with an eye towards achieving the envisaged modular character of the device, it is advantageous for the two deflection devices and the coupling mirror to be arranged in a housing or on a shared support. The housing or the support can be configured as a plate in the form of a monoblock, whereby the plate can be a preferably milled metal plate. The use of a metal plate as the support ensures optimal heat dissipation, especially heat dissipation from the individual rotary drives which can be configured as galvanometer drives in accordance with the explanations given above. The plate can be handled as such, so that the entire unit can be replaced quickly and easily.

particularly for purposes of attaining simple handling, also with respect to the ability to replace the entire device in the form of a monolithic block, it is also advantageous for integrated adjustment means to be provided for the individual rotary drives, namely, the x-rotary drive and the y-rotary drive. Thus, it is advantageous if, for adjustment purposes, the y-rotary drive can be moved along its axis of rotation, that is to say, in the x-direction, until the deflected light beam has been adjusted with respect to the x-drive or with respect to the deflection mirror situated there. To this end, an adjustment disk is provided in order to adjust the y-rotary drive together with the mirror provided there, whereby a concrete position of the y-rotary drive corresponds to a defined position of the light beam on the adjustment disk. In another advantageous manner, this adjustment disk is a matt disk that is at least partially light permeable and that preferably has a collimating mark. This collimating mark ultimately serves to adjust the y-rotary drive by means of the light beam that is deflected there.

In order to adjust the y-rotary drive, the x-rotary drive is taken away, in other words, it is removed from the plate that serves as the support. In this manner, via the mirrors that are associated with the y-rotary drive, the light beam directly strikes the adjustment disk that is arranged in the beam path—downstream from the mirror that faces away from the y-rotary drive—of the mirrors that rotate around the y-axis. The adjustment disk is likewise permanently associated with the housing or the support, that is to say, the plate, namely, preferably in the edge area of the entire arrangement, so that it does not interfere with the rest of the beam path. Thus, the adjustment disk is an auxiliary means that serves to adjust the y-rotary drive and that is permanently mounted in the module. Naturally, it is also conceivable to configure the adjustment disk so that it can be replaced. For the sake of attaining a simple design, the adjustment disk is glued into the housing or else onto the support or onto the plate.

It has already been mentioned above that the mirror that rotates around the x-axis, together with the x-rotary drive, can be removed from its operating position in order to release the beam path onto the adjustment disk. For this purpose, a special receptacle is provided in the plate, as a result of which the mirror that rotates around the x-axis, together with the x-rotary drive, can be inserted into its operating position in the receptacle and thus up to a defined stop. Simple handling is thus ensured.

In accordance with the explanations given above, in order to adjust the y-deflection device, the x-deflection device—the mirror together with the x-rotary drive—is removed, so that the light beam can be adjusted onto the x-deflection device. The adjustment disk serves as an auxiliary means for the above-mentioned adjustment.

When the x-deflection device is in place, the light beam coming from the y-deflection device is not deflected to the adjustment disk, but rather, it is deflected to the outside of the device by the x-deflection device that is in the operating position, namely, through a scanning lens. The scanning lens is advantageously likewise associated with the housing or with the support and thus with the plate, whereby the light beam exits through the scanning lens in order to form an intermediate image. The scanning lens can be permanently integrated into the housing or into the support and thus into the plate and it can also be adjusted there, so that a change in the position of the scanning lens and thus an adjustment relative to the scanning lens are not necessary.

In another advantageous manner, another device is provided for adjustment purposes, namely, a device for adjusting the x-deflection device, that is to say, for adjusting the x-rotary drive with the mirror provided there. Concretely, this means that a target that serves to adjust the x-deflection device is arranged outside of the housing or outside of the support, namely, preferably in the intermediate image that is generated there. This target serves exclusively for purposes of adjusting the x-deflection device and is removed from the area of the intermediate image after the adjustment, so that the light beam can continue without being hindered.

Thus, with the above-mentioned means, users can adjust the deflection devices very easily. The device, which is defined as a monoblock, can be handled in a state in which the deflection devices are already pre-adjusted.

It has already been mentioned above that important components of the device, that is to say, the optical components, are permanently mounted in the housing or on the plate. In this manner, the mirrors as well as the adjustment disk and the scanning lens can be affixed by means of gluing, whereby the rotatable mirrors are glued onto a special—rotatable—support which, in turn, is joined to the appertaining rotary driver.

The design of the entire device as a monolithic block, employing the plate that serves as the support, is enhanced in that an electronic board having direct connections is advantageously integrated into the housing or into the support. Bending stress on the cables of an electronic system that would otherwise be arranged on the outside is thus avoided. Accordingly, the housing or the support or the plate has an electric interface via which the electronic system of the device can be connected.

Furthermore, the housing or the support or the plate has a mechanical interface to the beam splitter of a microscope, preferably a confocal microscope, so that in this manner a mechanical link is created by suitable connection means, as a result of which replacement is simple.

In an advantageous manner, the housing or the support or the plate has an optical interface to a microscope, preferably via the above-mentioned scanning lens, which is likewise arranged on the plate so as to be integrated and adjusted.

Regarding the physical size, it should be pointed out that further miniaturization is possible. For instance, the housing or the support can be realized with a height within the range from 50 mm to 100 mm, a width within the range from 30 mm to 80 mm and a depth within the range from 30 mm to 80 mm. The housing or the support, with the optical components as a pre-adjusted unit, can be replaced.

In summary, it should be pointed out that the device, thanks to its monolithic design with a metallic plate as the support, displays optimal heat dissipation. Since an integrated electronic board is used, bending stress on the cables can be largely avoided. Owing to the fact that the scanning lens is integrated and pre-adjusted, the K-scanner can be pre-assembled on the galvanometer drive.

In comparison to the known K-scanners, the two deflection devices with their mirrors can be adjusted under beam control.

Insofar as the mirrors are permanently glued on or together with the appertaining supports, so-called wedge flaws can be compensated for during the gluing procedure, which is a major advantage. The adjustment technique realized here allows larger manufacturing tolerances in the metal machining, which translates into a reduction in manufacturing costs.

Regarding the production of the entire arrangement, it is advantageous that a kind of drilled hole is made for the x-rotary drive during manufacture. The x-drive can be easily inserted all the way to the stop. The adjustment disk that is used for the adjustment is likewise preferably glued, with a collimating mark, into the block or into the plate. The y-rotary drive can be moved in the x-direction until a corresponding mark on the adjustment disk has been reached. By doing so, the adjustment is carried out in a simple manner and with simple means.

Regarding the coupling mirror, in addition to the explanations given above, it should still be pointed out that the coupling mirror is preferably placed on a stop of the housing, so as to attain a stationary arrangement. It is also possible to glue the coupling mirror.

The adjustment undertaken here is particularly easy and yet effective since the y-rotary drive can be adjusted independently of the x-rotary drive. Therefore, the individual setting parameters do not influence each other. Whereas the axial position of the y-rotary drive can be adjusted by means of the adjustment disk, the x-rotary drive is inserted into the plate up to the stop. The image position is set in the x-direction by means of rotation. The control is effectuated in the intermediate image or by means of the target that is to be arranged there.

The device realized here and its arrangement make it possible to pre-adjust the deflection devices, so that replacement is easy to carry out. The K-scanner on the galvanometer drive can be pre-adjusted without additional auxiliary means and this can be done outside of the scanner. It is likewise possible to replace the entire module. The above-mentioned types of structural measures yield a scanning rate that is at least on a par with familiar high-end systems, although they have an extremely small and compact design. Moreover, they entail low moments of inertia around the y-axis which are considerably lower than those of conventional K-scanners. The result is a faster y-return and a higher frame rate. The y-galvanometer is faster and the x-galvanometer, due to its better heat dissipation, can be stressed to a greater degree, as a result of which it can likewise be operated at a higher speed.

BRIEF DESCRIPTION OF THE DRAWINGS

The teaching of the present invention can be embodied and refined in different ways. The present invention is elaborated upon below based on exemplary embodiments with reference to the drawings in which like reference numerals refer to like and corresponding parts of the various drawings. The drawings show.

DETAILED DESCRIPTION

Figure 1:
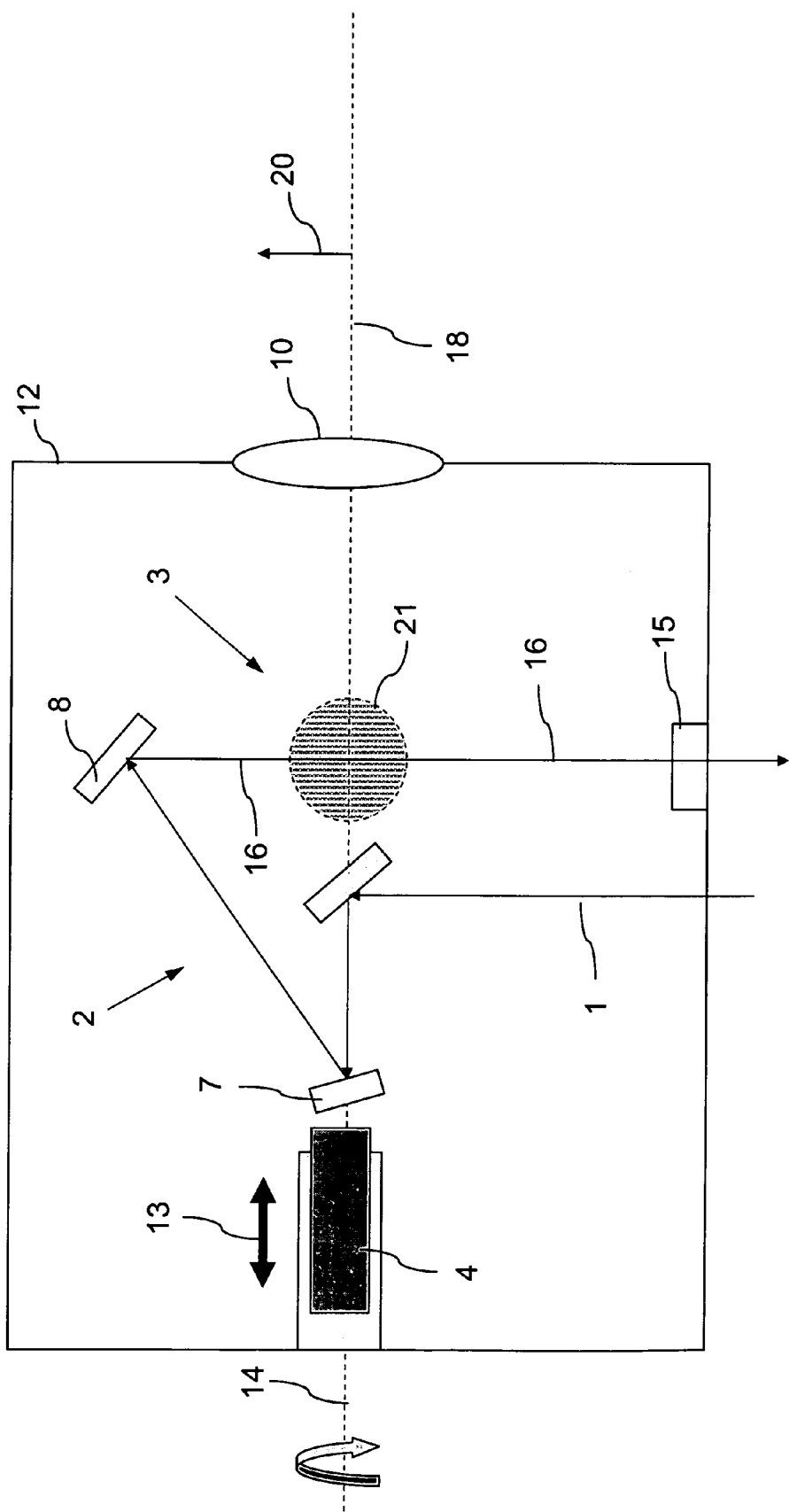
FIG. 1—a schematic view of an embodiment of an arrangement according to the invention, whereby here, the y-rotary drive is adjusted by means of an adjustment disk.
Figure 2:
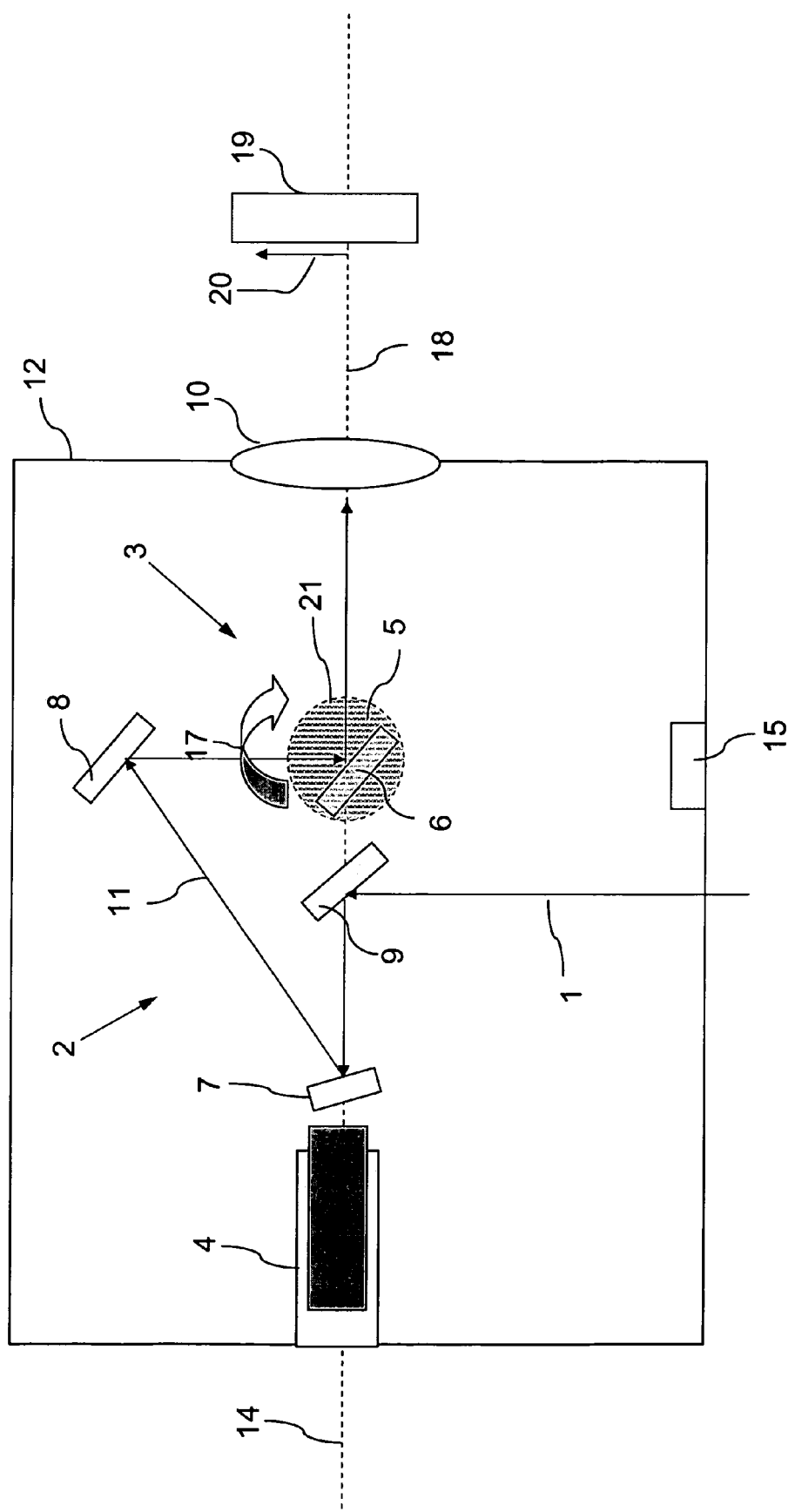
FIG. 2—a schematic view of the object shown in FIG. 1, whereby here, the x-rotary drive is adjusted using an external target.
Figure 3:
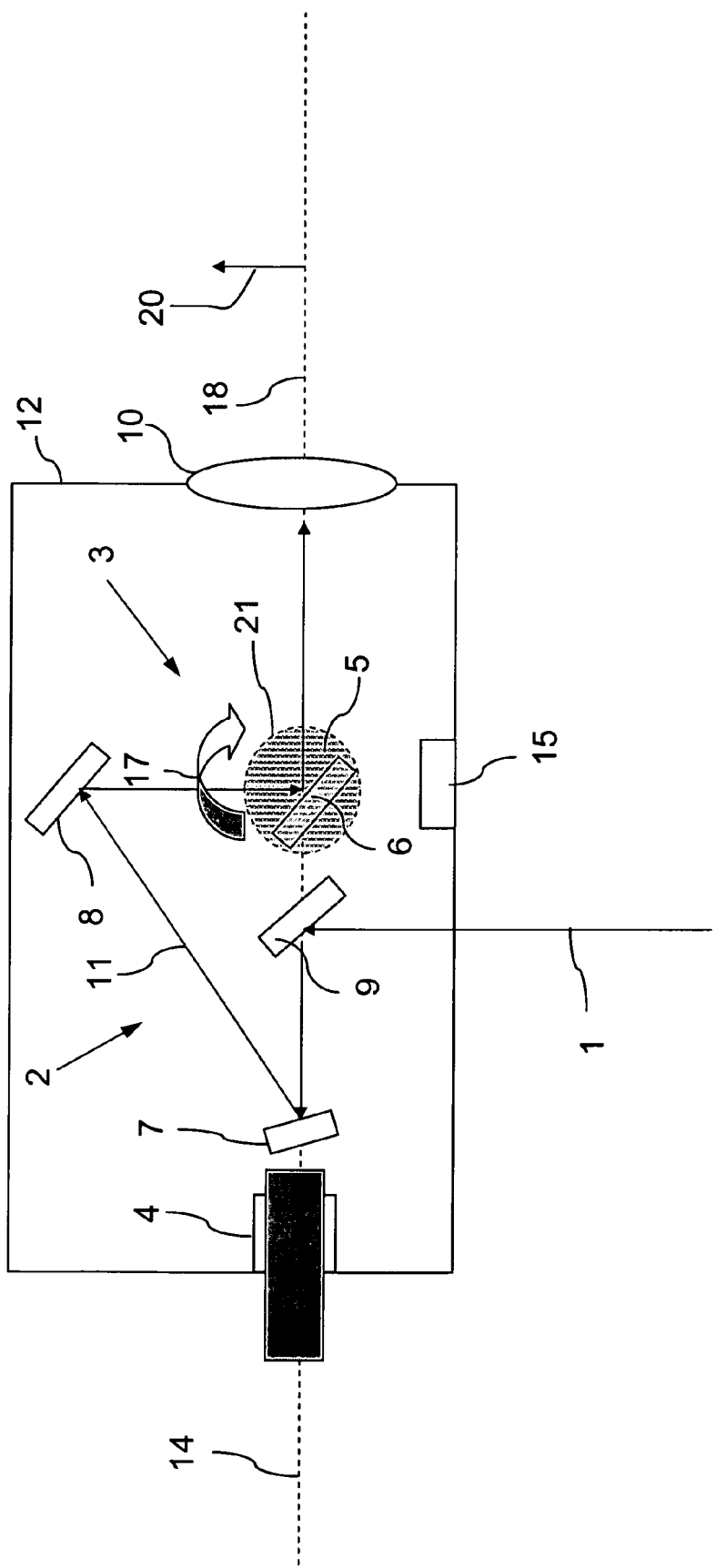
FIG. 3—a schematic view of the object shown in FIGS. 1 and 2 in the adjusted state, that is to say, in the actual operating state.

FIGS. 1 to 3 show an embodiment of an optical arrangement to deflect a light beam 1 in two directions that are essentially perpendicular to each other. Such a device is known from the state of the art as a K-scanner and can be used, among other things, in confocal scanning microscopes.

The arrangement comprises two deflection devices 2, 3 that are independent of each other, namely, a y-deflection device 2 and an x-deflection device 3. The two deflection devices 2, 3 are rotated by means of a rotary drive 4, 5 around axes that are perpendicular to each other, in other words, around the x-axis and the y-axis.

The figures also show that the x-deflection device 3 has a mirror 6 that rotates around the x-axis. The y-deflection device 2 comprises two mirrors 7, 8 that are arranged non-rotatably with respect to each other in a specified angular position, whereby, due to the mirrors 7, 8 that rotate around the y-axis, the light beam rotates around a center of rotation that is located on the axis of rotation of the mirror 6 that rotates around the x-axis. This relationship can be seen in the figures.

According to the invention, a coupling mirror 9 (shown in FIG. 2) is provided that deflects the light beam 1 onto one of the mirrors of the y-deflection device 2 that rotates around the y-axis at an angle greater than 45° relative to the surface of the mirror, namely, the mirror 7. From there, the light beam 1 is deflected to the mirror 8 and from there, in turn, it leaves the device via the x-deflection device 3 through an integrated scanning lens 10, as shown in FIGS. 2 and 3.

The figures also show that the coupling mirror 9 is arranged in the area between the two mirrors 7, 8 that rotate around the y-axis close to the beam path 11 that extends between the mirrors 7, 8. To put it more precisely, the coupling mirror 9 is arranged between the mirror 7 that is closest to the y-rotary drive 4 and the x-rotary drive 5 or the deflection device 3 that rotates around the x-axis. Thus, the coupling mirror 9 deflects the light beam 1 on the side facing away from the y-rotary drive 4 onto the mirror 7 that is closest to the y-rotary drive 4 and that belongs to the deflection device 2 that rotates around the y-axis. The rotary drives 4, 5 are configured as galvanometer drives.

The reference numeral 12 indicates that the entire arrangement is mounted on a plate that serves as the support. This plate 12 is designed as a milled plate in the form of a monoblock.

The double-headed arrow 13 in FIG. 1 indicates that, for adjustment purposes, the y-rotary drive 4 can be moved along its axis of rotation 14, that is to say, in the x-direction, whereby a concrete position of the y-rotary drive 4 corresponds to a defined position of the light beam 1 on an adjustment disk 15. This adjustment disk 15 is configured as a light-permeable matt disk that bears a collimating mark for the positioning of the light beam 1.

FIG. 1 also shows that the adjustment disk 15 is arranged in the beam path—downstream from the mirror 8 that faces away from the y-rotary drive 4—of the mirrors or of the deflection device 2 that rotate around the y-axis.

The adjustment disk 15 is likewise permanently attached to the plate 12, as a result of which it is already adjusted from the start. The attachment is achieved by means of a glued connection. In this manner, the adjustment disk 5 is glued inside a recess in the plate 12.

The depiction in FIG. 1 also shows that the mirror 6 (see FIG. 2) that rotates around the x-axis, together with the x-rotary drive 5, can be removed from its operating position in order to release the beam path onto the adjustment disk 15 or else it has already been removed in the situation depicted in FIG. 1. Thus, the light beam 16 coming from the mirror 8 strikes the adjustment disk 15 directly, so that the y-deflection device 2 can be adjusted using the mirrors 7 and 8 by axially moving the x-rotary drive 4.

FIG. 2 shows the same arrangement as in FIG. 1, although with the x-deflection device 3 put in place. The x-deflection device 3, together with the x-rotary drive 5 and the mirror 6, is inserted into a receptacle 21 formed in the plate 12 in the operating position shown in FIG. 2, whereby a stop is provided in the plate 12 in order to attain reliable positioning. The arrow 17 shows the rotational movement of the x-deflection device 13 or of the x-rotary drive 5.

The figures also all show that the plate 12 is associated with the scanning lens 10 through which the light beam exits. The scanning lens 10 is permanently connected to the plate 12, where it is appropriately adjusted.

It can be seen in FIG. 2 that a target 19 that serves to adjust the x-rotary drive 3 together with the mirror 6 can be arranged in the beam path 18 outside of the plate 12 in the intermediate image 20, so that the x-rotary drive 5, together with its mirror 6, can be adjusted independently of the y-rotary drive 4 and its mirrors 7, 8.

FIG. 3 shows the arrangement according to the invention in its actual operating state, namely, after the adjustment has been made. The light beam 1 is guided by the y-deflection device 2 and the x-deflection device 3 through the scanning lens 10, from where it leaves the area of the plate 12.

Regarding additional features that cannot be gleaned from the figures, in order to avoid repetitions, reference is hereby made to the general part of the description.

In conclusion, special mention should be made of the fact that the embodiments elaborated upon above merely serve to elucidate the teaching according to the invention but that the latter should not be construed as being restricted to these embodiments.

What is claimed is:

1. An optical arrangement for deflecting a light beam, comprising:
    a first deflection device rotatable about a first axis using a first rotary drive, the first deflection device including a first and a second minor disposed non-rotatably with respect to each other in an angular position so as to rotate jointly about the first axis;
    a second deflection device rotatable about a second axis using a second rotary drive, the second deflection device including a third minor; and
    a coupling mirror configured to deflect the light beam onto one of the first and second mirrors at an angle greater than 45° relative to the surface of the one mirror;
    wherein the first and second axes are perpendicular to each other;
    wherein the first and a second minors are configured to rotate jointly about the first axis so that the tight beam rotates about a center of rotation located on the second axis; and
    wherein the coupling mirror is disposed between the second rotary drive and a mirror of the first and second mirrors that is closest to the first rotary drive.

2. The optical arrangement as recited in claim 1 wherein the first and second deflection devices are configured to deflect the light beam in two directions that are perpendicular to each other.

3. The optical arrangement as recited in claim 1 wherein the first and second deflection devices are disposed in a confocal scanning microscope.

4. The optical arrangement as recited in claim 1 wherein at least one of the first and second rotary drives includes a galvanometer drive.

5. The optical arrangement as recited in claim 4 wherein the galvanometer drive includes a resonant galvanometer drive.

6. The optical arrangement as recited in claim 1 wherein the first and second deflection devices and the coupling minor are disposed at least one of in a housing and on a support.

7. The optical arrangement as recited in claim 6 wherein at least one of the housing and the support includes a plate having a form of a monoblock.

8. The optical arrangement as recited in claim 7 wherein the plate includes a milled metal plate.

9. The optical arrangement as recited in claim 1 wherein the first and second deflection devices and the coupling mirror are disposed at least one of in a housing and on a support, and further comprising a target for adjusting the second rotary drive, the target being disposable in a beam path of the light beam outside of at least one of the housing and the support.

10. The optical arrangement as recited in claim 9 wherein the target is disposed in an intermediate image of the optical arrangement.

11. The optical arrangement as recited in claim 1 wherein the first and second deflection devices and the coupling minor are disposed in a housing.

12. The optical arrangement as recited in claim 11 wherein the first and second deflection devices and the coupling mirror are glued into the housing.

13. The optical arrangement as recited in claim 1 wherein the first and second deflection devices and the coupling mirror are disposed in a housing, the housing including a mechanical interface connected to a beam splitter of a microscope.

14. The optical arrangement as recited in claim 13 Wherein the microscope includes a confocal microscope.

15. The optical arrangement as recited in claim 1 wherein the first and second deflection devices and the coupling minor are disposed at least one of in a housing and on a support, at least one of the housing and the support having a height within a range from 50 mm to 100 mm, a width within a range from 30 mm to 80 mm, and a depth within a range from 30 mm to 80 Mm.

16. The optical arrangement as recited in claim 1 wherein the first and second deflection devices and the coupling mirror are disposed in a housing, the housing and the first and second deflection devices and the coupling mirror being replaceable as a pre-adjusted unit.

17. An optical arrangement for deflecting a light beam, comprising:
    a first deflection device rotatable about a first axis using a first rotary drive, the first deflection device including a first and a second mirror disposed non-rotatably with respect to each other in an angular position so as to rotate jointly about the first axis;
    a second deflection device rotatable about a second axis using a second rotary drive, the second deflection device including a third mirror; and a coupling mirror configured to deflect the light beam onto one of the first and second mirrors at an angle greater than 45° relative to the surface of the one mirror;

wherein the first and second axes are perpendicular to each other;

wherein the first and a second mirrors are configured to rotate jointly about the first axis so that the light beam rotates about a center of rotation located on the second axis; and wherein the coupling mirror is disposed in an area between the first and second mirrors close to a beam path of the light beam extending between the first and second mirrors.

18. An optical arrangement for deflecting a light beam, comprising:

a first deflection device rotatable about a first axis using a first rotary drive, the first deflection device including a first and a second mirror disposed non-rotatably with respect to each other in an angular position so as to rotate jointly about the first axis;

a second deflection device rotatable about a second axis using a second rotary drive, the second deflection device including a third mirror; and a coupling mirror configured to deflect the light beam onto one of the first and second mirrors at an angle greater than 45° relative to the surface of the one mirror;

wherein the first and second axes are perpendicular to each other;

wherein the first and a second mirrors are configured to rotate jointly about the first axis so that the light beam rotates about a center of rotation located on the second axis; and wherein the coupling mirror is configured to deflect the light beam onto a mirror of the first and second mirrors that is closest to the first rotary drive on a side thereof facing away from the first rotary drive.

19. An optical arrangement for deflecting a light beam, comprising:

a first deflection device rotatable about a first axis using a first rotary drive, the first deflection device including a first and a second mirror disposed non-rotatably with respect to each other in an angular position so as to rotate jointly about the first axis;

a second deflection device rotatable about a second axis using a second rotary drive, the second deflection device including a third mirror; and a coupling mirror configured to deflect the light beam onto one of the first and second mirrors at an angle greater than 45° relative to the surface of the one mirror;

wherein the first and second axes are perpendicular to each other;

wherein the first and a second mirrors are configured to rotate jointly about the first axis so that the light beam rotates about a center of rotation located on the second axis; and wherein the first rotary drive is movable along the first axis.

20. The optical arrangement as recited in claim 19 further comprising an adjustment disk, a position of the first rotary drive corresponding to a position of the light beam on an adjustment disk.

21. The optical arrangement as recited in claim 20 wherein the adjustment disk includes a matt disk that is at least partially light permeable.

22. The optical arrangement as recited in claim 21 wherein the matt disk has a collimating mark for adjusting the first rotary drive.

23. The optical arrangement as recited in claim 20 wherein a one of the first and second mirrors faces away from the first rotary drive, and wherein the adjustment disk is disposed in a beam path of the light beam downstream from the one mirror.

24. The optical arrangement as recited in claim 20 wherein the first and second deflection devices and the coupling mirror are disposed at least one of in a housing and on a support, and wherein the adjustment disk is associated with at least one of the housing and the support.

25. The optical arrangement as recited in claim 24 wherein the adjustment disk is at least one of glued into the housing and glued onto the support.

26. The optical arrangement as recited in claim 20 wherein the third mirror and the second rotary drive are configured to be removed from an operating position so as to release a path of the light beam onto the adjustment disk.

27. The optical arrangement as recited in claim 20 wherein the first and second deflection devices and the coupling mirror are disposed at least one of in a housing and on a support, and wherein the third mirror and the second rotary drive are insertable into an operating position in a receptacle of at least one of the housing and the support.

28. An optical arrangement for deflecting a light beam, comprising:

a first deflection device rotatable about a first axis using a first rotary drive, the first deflection device including a first and a second mirror disposed non-rotatably with respect to each other in an angular position so as to rotate jointly about the first axis;

a second deflection device rotatable about a second axis using a second rotary drive, the second deflection device including a third mirror; and a coupling mirror configured to deflect the light beam onto one of the first and second mirrors at an angle greater than 45° relative to the surface of the one mirror;

wherein the first and second axes are perpendicular to each other;

wherein the first and a second mirrors are configured to rotate jointly about the first axis so that the light beam rotates about a center of rotation located on the second axis; and wherein the first and second deflection devices and the coupling mirror are disposed at least one of in a housing and on a support, and further comprising a scanning lens associated with at least one of the housing and the support, the scanning lens being configured to pass the light beam out of at least one of the housing and the support.

29. The optical arrangement as recited in claim 28 wherein the scanning lens is integrated in an adjusted fashion into at least one of the housing and the support.

30. An optical arrangement for deflecting a light beam, comprising:

a first deflection device rotatable about a first axis using a first rotary drive, the first deflection device including a first and a second mirror disposed non-rotatably with respect to each other in an angular position so as to rotate jointly about the first axis;

a second deflection device rotatable about a second axis using a second rotary drive, the second deflection device including a third mirror; and a coupling mirror configured to deflect the light beam onto a one of the first and second mirrors at an angle greater than 45° relative to the surface of the one mirror;

wherein the first and second axes are perpendicular to each other;

wherein the first and a second mirrors are configured to rotate jointly about the first axis so that the light beam rotates about a center of rotation located on the second axis;

wherein the first and second deflection devices and the coupling mirror are disposed in a housing, the housing including an optical interface connected to a microscope; and wherein the optical interface includes an integrated scanning lens.

* * * * *